United States Patent [19]

Martus

[11] Patent Number: 4,607,547
[45] Date of Patent: Aug. 26, 1986

[54] STRIPPED HEX HEAD DRIVE SOCKET

[76] Inventor: Donald G. Martus, 38235 Hazel Rd., Mt. Clemens, Mich. 48045

[21] Appl. No.: 698,970

[22] Filed: Feb. 6, 1985

[51] Int. Cl.$^4$ .......................... B25B 13/50; B25F 1/00
[52] U.S. Cl. ...................................... 81/53.2; 81/441; 81/181; 7/142; 30/168
[58] Field of Search ................ 81/53.2, 441, 186, 181, 81/119, 125.1, 120, 180.1, 185, 185.1, 185.2; 7/142; 29/275; 30/168

[56] References Cited

U.S. PATENT DOCUMENTS

| 1,093,252 | 4/1914 | Carnes | 81/181 |
| 1,554,287 | 7/1924 | McGuckin | 81/441 |
| 1,875,484 | 9/1932 | Nigra | 81/441 |
| 3,482,481 | 12/1969 | Newell | 81/119 |
| 3,881,377 | 5/1975 | Evans et al. | 81/186 |
| 3,908,489 | 9/1975 | Yamamoto | 81/186 |
| 3,913,427 | 10/1975 | Brase | 81/53.2 |
| 4,149,820 | 4/1979 | Newlin | 81/125.1 |

FOREIGN PATENT DOCUMENTS 177973  4/1922  United Kingdom .................. 81/185

Primary Examiner—Frederick R. Schmidt
Assistant Examiner—Bradley I. Vaught
Attorney, Agent, or Firm—Peter A. Taucher; John E. McRae; Robert P. Gibson

[57] ABSTRACT

A socket wrench modified by the addition of auxiliary gripper ribs to either prevent bolt head stripper action or to minimize the adverse effects of such stripper action. In one case the bolt head is initially formed to have grooves in its side surfaces mated to gripper ribs on the wrench. In an alternate arrangement the gripper ribs are designed as cutter devices to form grooves in the bolt side surfaces by the application of a hammering force on the wrench.

3 Claims, 18 Drawing Figures

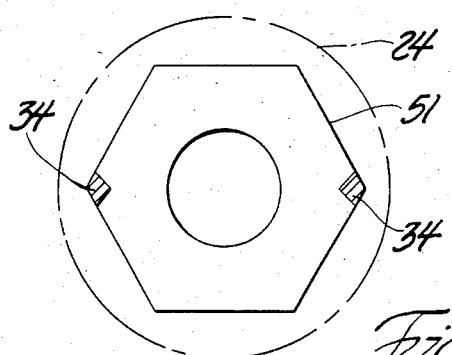
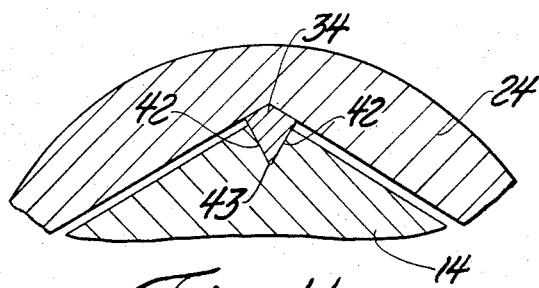
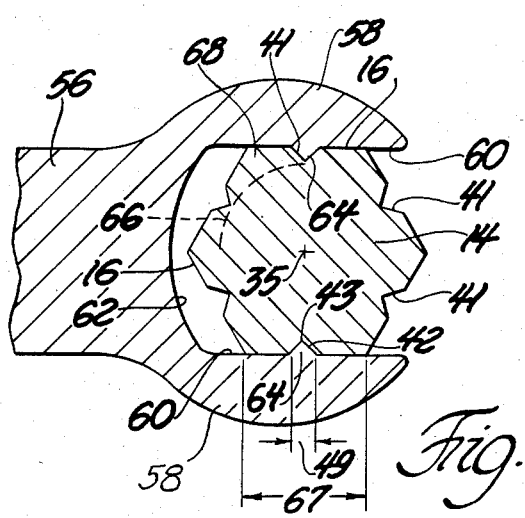
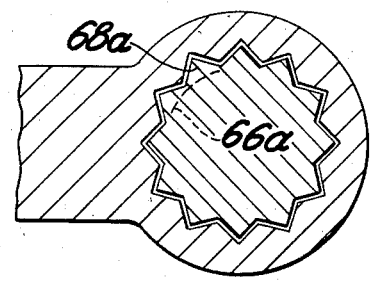
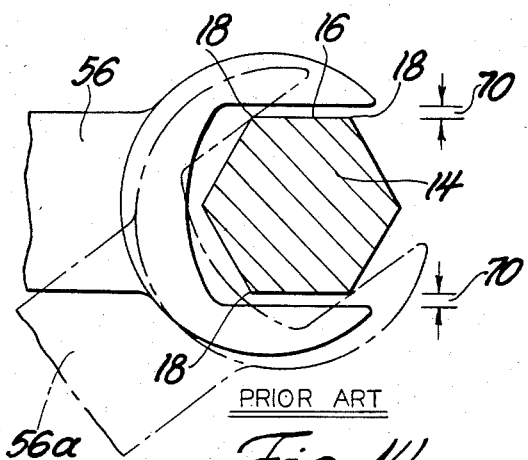
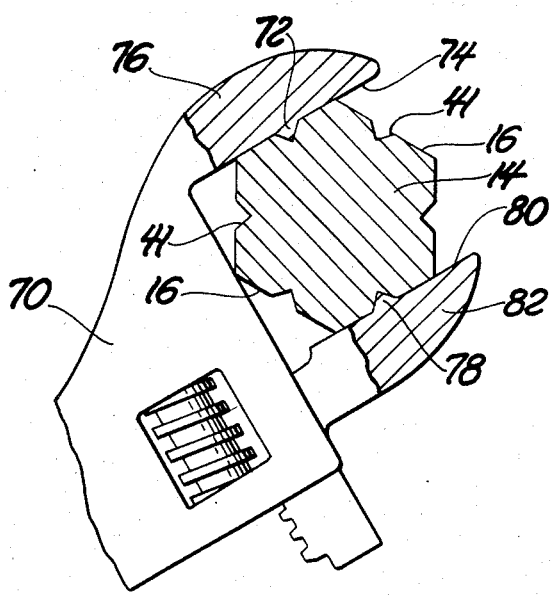
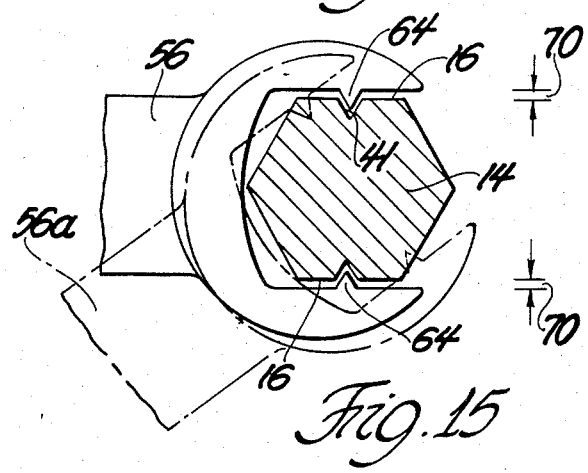

STRIPPED HEX HEAD DRIVE SOCKET

GOVERNMENT INTEREST

The invention described herein may be manufactured, used, and licensed by or for the Government for governmental purposes without payment to me of any royalty.

BACKGROUND AND SUMMARY OF THE INVENTION

This invention relates to gripper mechanism for the head of a bolt. The gripper mechanism may be associated with various types of turning implements to impart turning motions to the bolt, e.g., socket wrenches, open-end wrenches, or box wrenches.

The gripper mechanism includes at least two angular cross section ribs adapted to interact with triangular grooves formed in side faces of the bolt head. The rib-groove interaction improves or enhances the grip action of an otherwise conventional wrench.

The triangular grooves may be formed in the bolt head during initial bolt manufacture. Conversely, the triangular grooves may be formed by the ribs during application of the wrench onto the bolt head. In the latter event, a hammering force is required to install the wrench onto the bolt. During the hammering period, the ribs penetrate the material of the bolt head; the bolt material is spread apart to form triangular grooves mated to side areas of the associated ribs. The mated surfaces absorb the wrench turning forces.

The invention seeks broadly to minimize wear or deformation of bolt heads by wrench turning forces. In the alternative, the invention seeks to form new thrust surfaces on already-worn bolt heads, thereby preserving or prolonging the bolt useful service life.

THE DRAWINGS

FIG. 10 is a sectional view taken on line 10—10 in FIG. 9.

FIG. 11 is a fragmentary view similar to FIG. 5, but showing a structural detail used in the FIG. 9 assembly.

FIG. 12 is a sectional view taken through a further embodiment of the invention.

FIG. 13 is a sectional view taken through a wrench-bolt arrangement constructed according to prior art practice.

FIG. 14 is a schematic representation of the effect of wrench-bolt play on wrench action, when a prior art wrench is used.

FIG. 15 illustrates the effect of wrench-bolt play when a wrench embodying my invention is used.

FIG. 16 fragmentarily illustrates the invention, as applied to a crescent wrench equipped with a stationary jaw and movable jaw.

Figure 17:
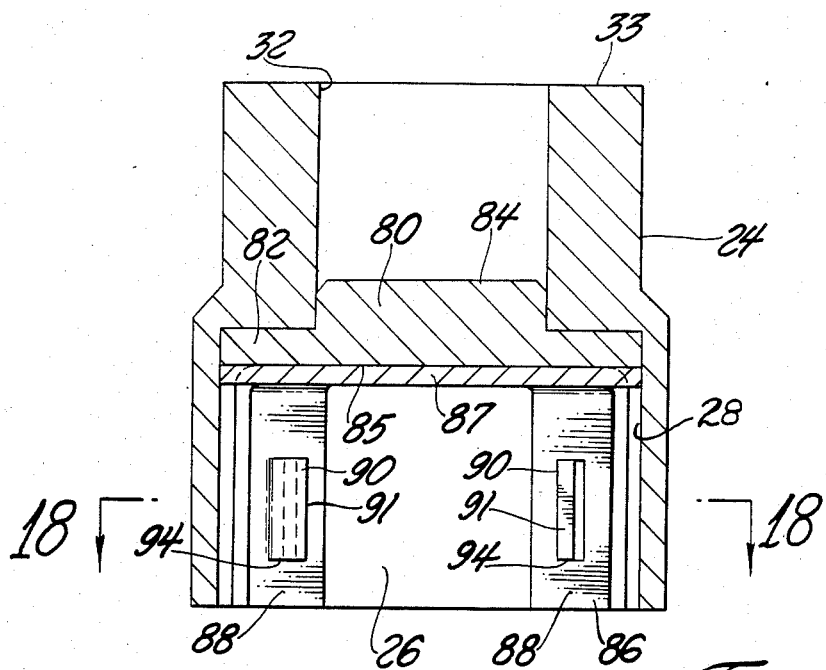

FIG. 17 illustrates another form of the invention.

Figure 18:
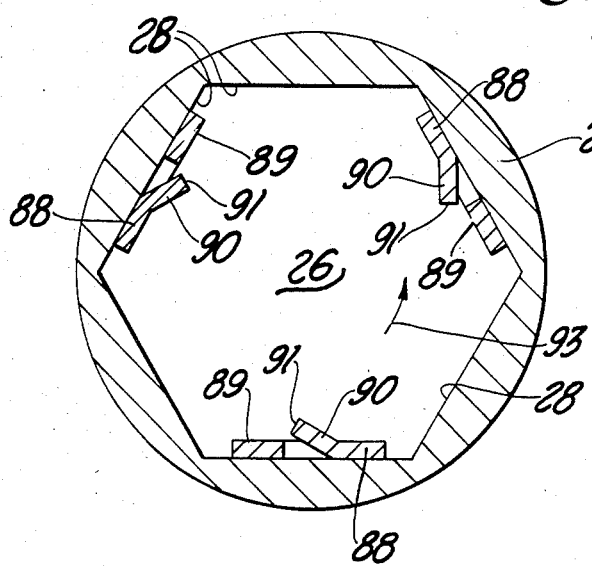

FIG. 18 is a view taken on line 18—18 on FIG. 17.

THE DRAWINGS IN GREATER DETAIL

Figure 1:
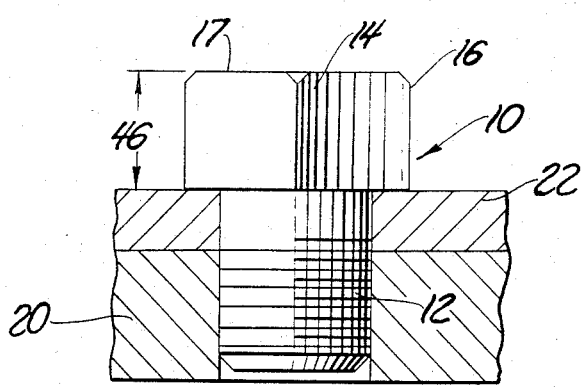
FIG. 1 shows a conventional bolt threaded into two work pieces for securing them together.
Figure 2:
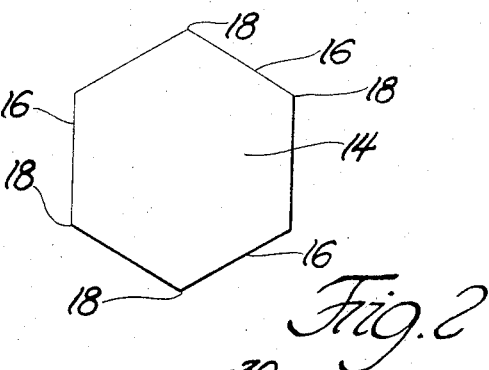
FIG. 2 is a top plan view of the FIG. 1 bolt.

FIGS. 1 and 2 shows a conventional bolt 10 that includes a threaded shank 12 and non-circular head 14. As seen in FIG. 2, the bolt head has a hexagonal plan configuration defined by external flat faces 16 and interconnecting corners 18. The bolt is adapted to be threaded into an opening in workpiece 20 to secure that workpiece to a second workpiece 22. Under conventional practice, the bolt is turned by a non-illustrated wrench, e.g., a socket wrench or open end wrench.

After the bolt has been removed and reinstalled a number of times the corners 18 of the bolt head tend to become rounded or stripped. At the next bolt installation operation or bolt removal operation the wrench will tend to slip on the bolt head instead of imparting a turning force to the bolt. Depending on whether the bolt is being removed or being installed, the bolt will either remain embedded in the work or will only partially penetrate into the work, with insufficient torque loading to maintain the workpieces together in the presence of adverse conditions, e.g., vibration, high loads, etc.

FIGS. 3 through 7

Figure 3:
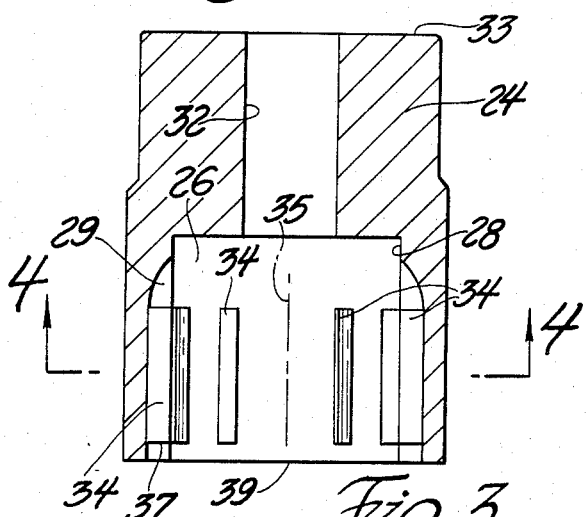
FIG. 3 is a sectional view taken through a socket wrench means incorporating my invention.

FIGS. 3 through 7 illustrate my invention applied to a socket wrench designed to impart a turning force to the bolt shown in FIGS. 1 and 2. As seen in FIG. 3, the socket wrench comprises a tubular wall means 24 suitably contoured to define a socket 26. The socket space is circumscribed (defined) by a series of internal flat surfaces 28 and interconnecting internal corners 30.

Socket 26 is sized to have a slip fit on bolt head 14, with socket surfaces 28 closely paralleling faces 16 of the bolt head. A square hole 32 is formed in tubular wall means 24 to receive a non-illustrated turning implement, e.g., a handle-ratchet assembly, crank arm, or torque wrench.

Figure 4:
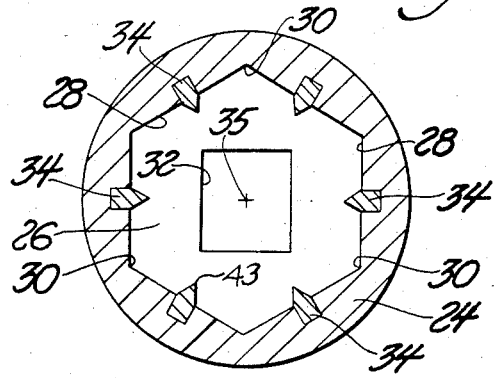
FIG. 4 is a sectional view taken on line 4—4 in FIG. 3.

The otherwise conventional socket wrench is modified by the addition of six ribs or fins 34. Each rib projects radially inwardly from the socket surface toward the central socket axis 35. Each rib may be formed as an integral part of the socket wall means, i.e., by the contour of the forging die used to originally configure the socket wall means. FIGS. 3 and 4 illustrate the ribs as being separately formed from the socket wall means.

A conventional tubular socket wrench structure 24 is modified by milling six slots 29 in socket surfaces 28. Rib-forming bars 34 are positioned in slots 29, after which the bars are welded to the socket wall means, to provide the FIG. 3 assembly.

The FIG. 3 assembly may be installed on head 14 of the FIG. 1 bolt by positioning the lower end of the FIG. 3 device on exposed face 17 of the bolt head, and applying a hammering force on the upper end 33 of the socket wall means. Preferably, the socket wall means is centered relative to the bolt head before application of the hammering force. Such centering may be facilitated by slightly recessing the lower ends 37 of bars 34 from the lower end face 39 of socket means 24.

Figure 5:
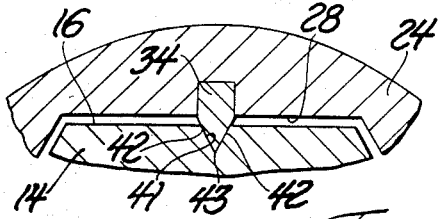
FIG. 5 is an enlarged sectional view through a structural detail used in the FIG. 3 wrench means.
Figure 6:
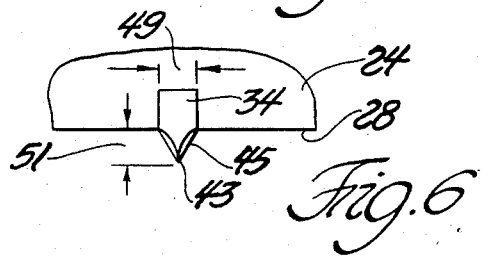
FIG. 6 is a bottom view of the FIG. 5 structure.

The hammering action on end face 33 of socket wall means 24 causes ribs (bars) 34 to penetrate the material of bolt head 14, to thereby form triangular grooves in the bolt head. FIG. 5 references one such groove with the numeral 41.

Penetration of the bolt head material is promoted (facilitated) by the materials used and by the contours on ribs 34. Preferably ribs 34 are formed of a material that is harder than the bolt material. Each rib is of angular cross-section, as seen in planes normal to socket axis 35. The angular cross-section, as best seen in FIG. 5, is defined by two rib sides 42 converging together in the direction of socket axis 35 to form a tip or apex 43, whereby the rib has a chisel shape suited to penetrate the bolt material.

Figure 7:
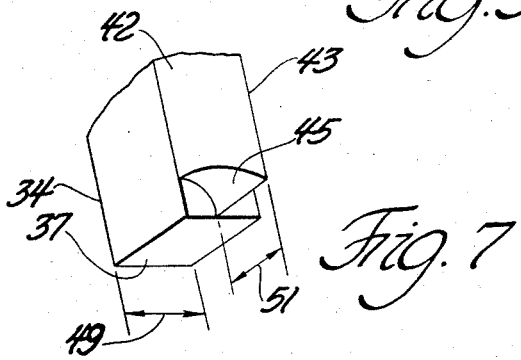
FIG. 7 is a fragmentary perspective view of a rib means used in the FIG. 5 structure.

Penetration of each rib 34 into the bolt material may also be facilitated by forming the lower end 37 of the rib to a chisel configuration, as indicated generally at 45 in FIG. 7. Chisel configuration 45 is probably necessary only in the larger bolt sizes where each rib 34 is required to displace significant quantities of bolt material. In the smaller bolt sizes, chisel configuration 45 will probably not be necessary or desirable.

FIG. 4 illustrates the socket wall means as having six ribs 34. A lesser number of such ribs can be used, e.g., two ribs circumferentially spaced apart by one hundred eighty degrees, or three ribs circumferentially spaced apart by one hundred twenty degrees. If a lesser number of ribs is used, the hammering force may be somewhat reduced. Also, a lesser number of ribs may be appropriate in the smaller bolt sizes, due to space constraints and concern for bolt head integrity.

The action of convergent rib sides 42 is a spreader action on the bolt material. The material is displaced laterally; some densification of the material may take place, similar to the action that takes place during a forging operation. Surfaces 28 on socket wall means 24 confine the displaced bolt material against uncontrolled movement or separation from the bolt body.

The axial length of each rib 34 is preferably at least as great as the axial dimension 46 of the bolt head, whereby the ribs 34 and grooves 41 have a relatively great interaction length. The included angle of rib sides 42, 42 (generated from apex 43) is preferably at least forty degrees, but not more than ninety degrees. A preferred angle is about sixty degrees. Different bolt sizes may necessitate different included angles, to maintain a desired rib mechanical integrity. The width of each rib 34, as indicated by numeral 49 in FIG. 7, is preferably about the same as the rib penetration distance indicated by numeral 51.

After socket wall means 24 has been hammered into a telescoped position surrounding bolt head 14, the socket wall means can be turned (by a suitable implement extended into square hole 32). Ribs 34 interact with grooves 41 to provide a gripper action on the bolt. The bolt can be turned (to or from its inserted position in the work) even though the bolt corners 18 are rounded, as from previous turning operations.

FIG. 8 CONSTRUCTION

Figure 8:
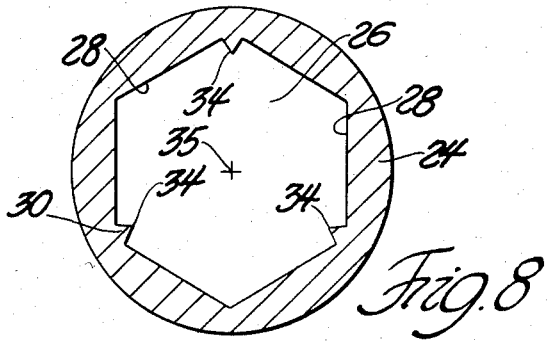
FIG. 8 is a view similar to FIG. 4, but illustrating another form of the invention.

FIG. 8 illustrates a variant of the invention that is generally similar to the FIG. 4 structure. However, in this case ribs 34 are formed integrally with socket wall means 24. Also, only three ribs are utilized. Further, the ribs are located at internal corners 30 of the socket wall means, rather than on the flat surfaces 28, as in the FIG. 4 arrangement. Operation of the FIG. 8 structure is generally the same as the FIG. 4 structure.

FIGS. 9 THROUGH 11

Figure 9:
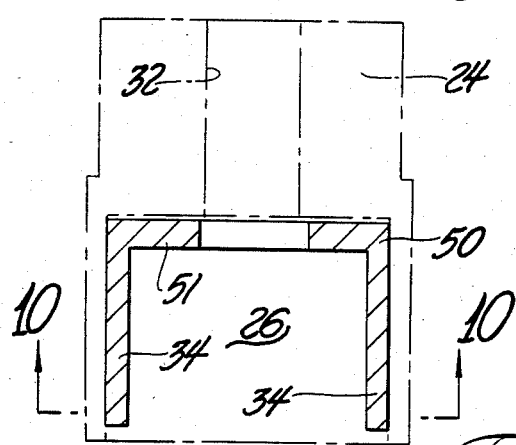
FIG. 9 is a sectional view similar to FIG. 3, but illustrating an additional form of the invention.

FIGS. 9 and 10 illustrate a structure wherein the ribs are located at internal corners of the socket wall means. In this respect the FIG. 9 structure is similar to the FIG. 8 structure. However, in the FIG. 9 arrangement, the ribs are formed separately from the socket wall means. To emphasize the nature of the rib mechanism, the socket wall means is shown in dashed lines in FIGS. 9 and 10. The socket wall means would (or could) be constructed as a tubular body similar to the socket body shown in FIG. 3.

The rib mechanism is formed as an insert member 50 adapted to snugly fit into the tubular body. Member 50 comprises a flat plate 51 having a hexagonal configuration corresponding to the internal plan shape of socket space 26. Two rib-forming bars 34 extend from plate 51 for disposition in the corner areas of the socket body. The socket body 24 supports the ribs against bending or breakage when the two piece unit (members 24 and 50) is hammered onto bolt head 14. During usage members 24 and 50 act as a single unitary member.

The arrangement of FIGS. 9 through 11 is designed to utilize conventional socket members 24 already commercially available on the market. Members 50 would be constructed as add-on insert members sized to fit snugly into the conventional socket members.

FIG. 12 CONSTRUCTION

The arrangements of FIGS. 3 through 11 contemplate socket wall mechanisms equipped with angular cross-sectioned ribs 34 designed to penetrate edge areas of the associated bolt head to form interacting grooves therein. FIG. 12 illustrates an arrangement wherein the grooves are formed during initial bolt manufacture. The associated ribs 64 act only as thrust elements during bolt-turning operations.

In the FIG. 12 arrangement, the socket wall means is formed as an integral part of an open end wrench 56. The wrench comprises two jaws 58 having internal flat jaw surfaces 60 interconnected by internal corner surfaces 62. Angular cross-sectioned ribs 64 project from jaw surfaces 60 toward an imaginary socket axis 35.

The associated bolt head 14 is formed with six triangular cross-sectioned grooves 41 shaped to mate with ribs 64 when the wrench is positioned on the bolt head. Ribs 64 interact with grooves 41 to provide gripper actions on the bolt head when a manual turning force is applied to the wrench. Ribs 64 and grooves 41 may be shaped similarly to the previously described ribs 34 and grooves 41.

FIG. 13 PRIOR ART STRUCTURE

FIG. 13 illustrates a commercially available closed end wrench (sometimes termed a box wrench) having twelve triangular ribs thereon adapted to interfit with twelve triangular grooves formed in the side faces of the associated bolt head. The overall arrangement is somewhat similar to that of FIG. 12. However, it will be noted that with the FIG. 12 arrangement, the grooves are more widely spaced than the grooves in the FIG. 13 arrangement. The FIG. 12 bolt head is believed to have greater resistance to stripping (rounding off the corners) than the FIG. 13 bolt head.

FIG. 12 indicates by dashed line 66 the path taken by the tip (apex) of a rib 64 during a bolt-turning operation.

The bolt area 68 above curved line 66 represents the principal mass of material subjected to load during the turning operation. The relatively large spacing between grooves 41, and the relatively long flat surfaces 16 on the bolt head provide a relatively large mass of bolt material 68 oriented to carry the turning load.

In the FIG. 13 arrangement, the bolt area oriented to carry the turning load is the triangular zone 68a between adjacent ones of the bolt grooves. That triangular zone is small compared to area 68 shown in FIG. 12. Rough calculations indicate area 68a to be only about one-fourth of area 68. The resistance of the FIG. 12 bolt to head stripping forces is believed to be appreciably greater than the corresponding resistance of the FIG. 13 bolt.

It is noted that the FIG. 13 bolt head has twelve areas 68a potentially resistant to stripping forces, whereas the FIG. 12 bolt head has only six areas 68. However, it is believed that in practice only some of the various areas 68a are subjected to turning loads. Manufacturing tolerances cause some variation in the area and spacing of the various areas 68a. Such variations cause the loads to be carried by only a few of the various areas 68a (as opposed to all such areas).

The load-carrying advantages of the FIG. 12 arrangement are believed to be greatest in the small bolt sizes, where the mating ribs and grooves have relatively small radial dimensions (measured from socket axis 35). Small dimensioned ribs tend to more readily wear away under wrench-turn forces.

In the FIG. 12 arrangement, the turning loads are absorbed (or carried) by ribs 64, jaw faces 60, and bolt faces 16. Ribs 64 are considered auxiliary load-carrying elements; the major load-carrying elements are jaw surfaces 60. Ribs 64 have width dimensions 49 that are relatively small compared to the effective width dimensions 67 of jaw surfaces 60. Dimension 49 should be no more than about one-fourth of dimension 67.

FIGS. 14 AND 15

FIGS. 14 and 15 are intended to illustrate the effect of coarse manufacturing tolerances on bolt head stripping action. FIG. 14 illustrates the effect when using a conventional wrench-bolt system. FIG. 15 illustrates the effect when the arrangement of FIG. 12 is used.

FIG. 14 shows an open-end wrench 56 arranged loosely on hexagonal bolt head 14; numerals 70 illustrate the play or fit tolerance between the wrench surfaces and bolt faces. When the wrench is turned to dashed line position 56a, no force is transmitted to the bolt. The wrench is ineffective to turn the bolt. It can be visualized that with tolerances somewhat less than tolerances 70 the wrench would apply high localized forces on the wrench corners, rounding them off to unusable conditions.

FIG. 15 shows an open-end wrench 56 equipped with angular cross-sectioned ribs 64. Bolt head 14 has mating grooves 41 in its flat faces 16. When the wrench is turned to position 56a, ribs 64 exert turning forces on the bolt even in spite of the relatively wide tolerances 70.

The interacting grooves 41 and ribs 64 are believed to be useful in correcting or compensating for wide manufacturing tolerances on the bolt and/or wrench.

FIG. 16 STRUCTURE

FIG. 16 illustrates the invention applied to an adjustable wrench 70. The wrench is of conventional construction except that it includes an angular rib 72 on flat surface 74 of stationary jaw 76, and an angular rib 78 on flat surface 80 of movable jaw 82. The associated bolt is manufactured to have triangular cross-sectioned grooves 41 in its flat faces 16.

Ribs 72 and 78 interact with grooves 41 to provide gripper actions on bolt head 14 when a turning force is applied to the wrench. Ribs 72 and 78 are dimensioned and configured similarly to the aforementioned ribs 34 and 64.

FIGS. 17 AND 18

FIGS. 17 and 18 illustrate a further form of the invention constructed generally along the lines of the FIG. 9 construction. The structure of FIGS. 17 and 18 is designed for usage on a bolt head that has become worn or rounded at its corner areas to such an extent that it is impossible to turn the bolt with a conventional socket structure. The structure of FIGS. 17 and 18 includes ribs or fins designed to cut into the bolt head and thereby interlock with the bolt head material to facilitate a bolt-turning action.

As shown in FIGS. 17 and 18, the structure includes a conventional socket wall means 24 internally contoured to define six socket surfaces 28. The space circumscribed by surfaces 28 constitutes a socket 26. A square hole 32 is formed in wall means 24 to receive a non-illustrated turning implement.

An insert member 80 is removably disposed within socket 26 to mask off the square hole 32, and thus form an imperforate end wall for the socket space. As shown in the drawing, member 80 includes a flat plate portion 82 of hexagonal outline configuration, and a square projection or protuberance 84. Member 80 is manually insertable into socket space 26 so that projection 84 fits into the aforementioned square hole 32. When member 80 is disposed within socket space 26 its lower surface 85 forms an abutment surface suitable for absorbing impact loads associated with a hammering action applied to end face 33 of the socket wall means.

A second insert member 86 is sized to fit into socket space 26 to form ribs or fins similar to aforementioned ribs 34. Member 86 includes a flat plate or wall 87 of hexagonal outline configuration, and three rectangular walls 88 extending at right angles to plate 87. When member 86 is inserted into socket space 26 walls 88 have facial engagement with socket surfaces 28.

A rib or fin 90 is struck out from each wall 88 during the process of forming member 86. Each rib 90 performs the same function as ribs 34 in the arrangements of FIGS. 4, 8 or 9. Member 86 is preferably formed as a steel stamping from relatively high hardness material. In a typical situation the material for walls 87 and 88 is about 0.024 inch thick. The axial length of each rib 90 is a significant percentage of the bolt head thickness (dimension 46 in FIG. 1). Each rib 90 is preferably located approximately midway between internal corners 30 of the socket wall means.

Socket wall means 24 is selected or designed so that socket space 26 is slightly enlarged relative to the bolt head on which the socket wall means is to be used. The amount of socket oversizing is such that when the socket wall means is applied to the bolt head the exposed faces 89 of walls 88 will closely parallel the flat faces of the bolt head. Walls 88 will then define socket surfaces.

A hammering force applied to end face 33 of the socket assembly will cause ribs 90 to penetrate the bolt head, to interlock with the bolt head material; edges 94 of ribs 90 cut into the bolt material. With the socket assembly locked to the bolt head it is possible to turn the bolt out from the work. Ribs 90 are oriented so that when the assembly is rotated to turn out the bolt the end edges 91 of the ribs will receive the turning force. As seen in FIG. 18, the bolt turn-out direction is designated by numeral 93.

APPLICATION OF THE INVENTION

FIGS. 3 through 11, 17 and 18 illustrate wrench structures modified by the addition of ribs 34 for the purpose of forming grooves in conventional bolt heads 14. The structures of these FIGS. would find most usage in situations where a conventional bolt head has been rounded or stripped at its corners as a result of repetitive removal-reinsertion operations during a period of service.

FIGS. 12 and 16 illustrate a wrench-bolt arrangement wherein triangular grooves are formed on side faces of the bolt head at initial bolt manufacture. The structural arrangements of FIGS. 12 and 16 would find most usage in original installation situations where it is anticipated that the bolts will be tightened down to high torque values and/or where it is anticipated that the bolts will be removed and reinstalled at fairly frequent time intervals.

The general purpose of the invention is to either prevent the undesired bolt head-stripping action (FIGS. 12 and 16) or to minimize the undesired consequences of such stripping action after it has occurred (FIGS. 3 through 11, 17 and 18).

The invention is believed applicable to various types of socket wrenches, including ratchet-operated socket wrenches, open-end wrenches (with partial sockets), box wrenches, vise grips or channel locks. When the invention is applied to wrenches of the movable jaw type, the gripper ribs will be formed on both the stationary jaw and movable jaw. In many situations, gripper ribs will be provided on three or more wrench surfaces. The drawings show the invention applied to hexagonal head bolts; the invention could also be applied to square head bolts. Bolts of various different sizes can use (or be modified to use) the invention.

I wish it to be understood that I do not desire to be limited to the exact details of construction shown and described for obvious modifications will occur to a person skilled in the art, without departing from the spirit and scope of the appended claims.

I claim:

1. In association with a gripper mechanism for the head of a bolt, wherein the bolt head has an end face, and a series of external flat side faces and interconnecting side corners, and said gripper mechanism comprises socket wall means that forms a socket sized to fit on the bolt head; said socket wall means comprising internal flat surfaces and interconnecting internal corners; said internal flat surfaces being equidistantly spaced from the socket axis, and said internal flat surfaces being sized to closely parallel the flat side faces on the bolt head to thereby exert turning forces thereon:

the improvement comprising means forming at least two cutter ribs projecting inwardly from the socket wall means toward the socket axis; the spacing between the innermost edges of the cutter ribs and the socket axis being less than the corresponding spacing between the external surfaces of the bolt head and the bolt axis whereby when the gripper mechanism is positioned on the bolt head, the ribs will overlie the end face of the bolt head; said ribs being spaced and oriented so that a hammering force on the gripper mechanism causes the ribs to penetrate into the bolt head and form grooves therein; the inter-engagements between the ribs and groove surfaces being such that the gripper mechanism is enabled to exert a turning force on the bolt head even though the aforementioned corners had previously worn away; each cutter rib having an axial length that is almost as great as the axial dimension of the bolt head, whereby the ribs have extensive area contact with the head matter; said rib-forming means being comprised of an insert member formed separately from the socket wall means, said insert member being snugly fittable into the socket, said insert member being removable from the gripper mechanism, whereby the gripper mechanism can be utilized without the insert member; said insert member including an end plate and a plural member of rib walls extending at right angles to said plate, said plate having the same configuration as the outline configuration of the socket whereby when the insert member is inserted into the socket, the plate prevents said insert member from rotating in the gripper mechanism; said insert member having an axial length dimension slightly less than the corresponding dimension of the associated socket so that the ends of the cutter ribs are slightly recessed from an external end surface of the socket wall means, whereby the socket wall means can be centered on the bolt head prior to application of a hammering force on the gripper mechanism.

2. The improvement of claim 1 wherein the rib walls are oriented to the associated plate so that when the insert member is positioned in the socket, the defined ribs will be located at flat surfaces of the socket wall means approximately midway between internal corners of the socket wall means.

3. The improvement of claim 1 wherein the rib walls are oriented to the associated plate so that when the insert member is positioned in the socket the defined ribs will be located at internal corners of the socket wall means.

* * * * *